US012647821B2

(12) United States Patent
Thieme

(10) Patent No.: US 12,647,821 B2
(45) Date of Patent: Jun. 2, 2026

(54) SYSTEM AND METHOD FOR LPWAN

(71) Applicant: 13486826 Canada Inc., Scarborough (CA)

(72) Inventor: Wolfgang Thieme, Schwaig (DE)

(73) Assignee: 13486826 CANADA INC., Scarborough (CA)

( * ) Notice: Subject to any disclaimer, the term of this patent is extended or adjusted under 35 U.S.C. 154(b) by 361 days.

(21) Appl. No.: 18/025,842

(22) PCT Filed: Sep. 9, 2021

(86) PCT No.: PCT/IB2021/058216
§ 371 (c)(1),
(2) Date: Mar. 10, 2023

(87) PCT Pub. No.: WO2022/053979
PCT Pub. Date: Mar. 17, 2022

(65) Prior Publication Data
US 2023/0362719 A1 Nov. 9, 2023

Related U.S. Application Data

(60) Provisional application No. 63/081,939, filed on Sep. 23, 2020, provisional application No. 63/076,532, filed on Sep. 10, 2020.

(51) Int. Cl.
*H04W 28/04* (2009.01)
*H04W 28/06* (2009.01)
*H04W 88/08* (2009.01)

(52) U.S. Cl.
CPC ........... *H04W 28/04* (2013.01); *H04W 28/06* (2013.01); *H04W 88/085* (2013.01)

(58) Field of Classification Search
CPC ..... H04W 28/06; H04W 28/04; H04W 92/12; H04W 88/085; H04W 84/10; Y02D 30/70
See application file for complete search history.

(56) References Cited

U.S. PATENT DOCUMENTS 10,932,176 B1 * 2/2021 Butler ............... H04W 36/0079
11,196,618 B1 * 12/2021 Butler ............... H04W 36/0033
(Continued)

FOREIGN PATENT DOCUMENTS

EP 3499928 A1 6/2019
WO WO-2019229512 A1 12/2019

OTHER PUBLICATIONS

Wang, Rui et al. "Potentials and challenges of C-RAN supporting multi-RATs toward 5G mobile networks." IEEE Access 2 (2014): 1187-1195.

*Primary Examiner* — Syed Ali
(74) *Attorney, Agent, or Firm* — Perry + Currier Inc.

(57) ABSTRACT

A novel LPWAN system and method of operating such a system is disclosed. The network deploys a plurality of endpoints communicating with at least one radio. Each radio in the system communicates, in turn, with a single basestation. The single basestation enables simplified network management (e.g. —endpoint admission, etc.) and basestation maintenance (e.g. —software updates, etc.) and reduces network deployment costs, as the single basestation device serves multiple radios over multiple coverage areas. The single basestation can be a software network core executed on a service device/server, such as a cloud SaaS service, allowing the computational capacity of the basestation to be scaled, as necessary, to service the network. The single basestation can also execute network cores for two or more network standards By having multiple radios provide their received signals to the single basestation, signal processing algorithms which can process multiple received versions of a signal to enhance the signal's effective SNR can also be employed.

10 Claims, 6 Drawing Sheets

(56)          References Cited

U.S. PATENT DOCUMENTS

| | | | | |
|---|---|---|---|---|
| 11,350,342 B1 * | 5/2022 | Zee | .................. | H04W 76/12 |
| 11,617,094 B2 * | 3/2023 | Honkasalo | ........... | H04L 41/044 |
| | | | | 455/446 |
| 2019/0312610 A1 * | 10/2019 | Dongare | .............. | H04L 27/103 |
| 2019/0394172 A1 | 12/2019 | Hersent | | |
| 2020/0236561 A1 * | 7/2020 | Sevindik | .............. | H04W 76/15 |
| 2021/0045011 A1 * | 2/2021 | Mishra | ................ | H04B 1/0003 |
| 2021/0068096 A1 * | 3/2021 | Abedini | ............... | H04W 72/52 |
| 2021/0144560 A1 * | 5/2021 | Sesia | ...................... | H04W 4/70 |
| 2021/0289421 A1 * | 9/2021 | Akl | .................. | H04W 28/0263 |
| 2022/0095233 A1 * | 3/2022 | Gilson | ................... | H04W 4/38 |

* cited by examiner

600

Radio          Backhaul network          Basestation

605
Receive data transmission from endpoint

610
Digitally sample signal

615
Transfer output digital samples via backhaul network

620
Receive output digital samples via backhaul network

625
Execute network core to recover transmission

SYSTEM AND METHOD FOR LPWAN

FIELD OF THE INVENTION

The present invention relates to wireless data communications systems. More specifically, the present invention relates to a wireless data communications system for LPWAN data telecommunications and a method of operating an LPWAN data telecommunications network.

BACKGROUND OF THE INVENTION

Low Power Wide Area Networks (LPWANs) are known and, with the availability and cost reductions of various sensor systems and, with the large scale deployment of internet of things (IoT) devices, are becoming increasing attractive for a wide variety of uses.

Prior art discussion of such networks includes a variety of publications, including IEEE 802.15.4-2011: "IEEE Standard for Local and Metropolitan Area Networks; Part 15.4: Low-Rate Wireless Personal Area Networks (LR-WPANs)" and, more recently, ESTI Technical Standard 103 357 V1.1.1, commercially referred to as "MIOTY". Such networks generally comprise a centralized basestation which communicates with a variety of endpoints.

It is generally desired that such LPWAN networks become ubiquitous, allowing their use for a wide variety of useful purposes, including environmental monitoring within industrial buildings, occupancy monitoring in commercial buildings, utility meter reporting, etc. and it is therefore contemplated that many such networks will be deployed. Thus, equipment costs, deployment costs and ongoing network management costs are significant considerations for the selection, deployment and operation of such networks.

To reduce endpoint costs for LPWAN networks, such as MIOTY, transmission protocols are employed which have been selected to minimize the necessary amount of computational processing required at the endpoint. Thus encoding techniques with a low computational cost, such as forward error correction based upon LDPC (Low Density Parity Checking), are employed. Further, relatively low data transmission rates are employed to communicate between the basestation and the endpoints which, along with the corresponding selected radio and protocol designs, such as the pre-defined TS-UNB mode (ETSI TS 103357) used by MIOTY, allow for the endpoints to be battery-powered, without requiring battery replacement for long (ideally multi-year) operating lifetimes.

However, problems still exist with existing LPWANs as the hardware for basestations in LPWANs is expensive, as is the associated expense of performing network management at the multiple basestations.

This is a particular problem for modern LPWANs, such as MIOTY, which employ a software defined radio architecture and therefore require extensive processing on the basestation to recover signals from endpoints. LPWAN deployments typically require multiple basestations in order to communicate with endpoints over the desired large service areas, so low cost basestation hardware is typically specified and/or preferred, to reduce the deployment costs. However, such low cost basestation hardware is not generally computationally powerful and therefor processing by the basestations of the radio signals received from endpoints is quite limited, reducing the effective Signal to Noise Ratio of the received signals and thus reducing the overall probability of the basestation correctly receiving signals transmitted from endpoints. This reduces the expected area which can be served by a basestation, requiring additional basestations, or requires endpoints to transmit at higher powers, reducing their battery lifetime.

Further, as LPWAN basestations are co-located with their radio receivers and antennas, the basestations must be installed close to the antenna to keep the antenna cabling as short as possible to reduce cable losses and reduce the requirement for LNAs (Low Noise Amplifiers). As is known to those of skill in the art, LNAs are expensive, consume relatively large amounts of power and must be properly tuned, according to the cable length and resulting losses, for each specific installation. Also, the basestations need to be either constructed to be capable of being installed out of doors, or must be enclosed in appropriate weatherproof structures, complicating the requirements for cooling of equipment and increasing hardware and maintenance costs.

It is desired to have a system and method of providing a wireless data communications system, and in particular, an LPWAN, which overcomes these disadvantages.

SUMMARY OF THE INVENTION

It is an object of the present invention to provide a novel system and method for a wireless data communications system which obviates or mitigates at least one disadvantage of the prior art.

According to a first aspect of the present invention, there is provided a wireless data communications system comprising: a plurality of endpoints, each endpoint operating according to a predefined network standard and transmitting data via radio transmissions in accordance with the network standard; at least one radio operable to receive radio transmissions from at least one of the plurality of endpoints, the radio creating digital samples of the inphase and quadrature components of the received radio transmissions and outputting the digital samples; a basestation executing a network core corresponding to the predefined network standard; a backhaul telecommunications network transferring output digital samples from the at least one radio to the basestation; and wherein the network core executing at the basestation processes the transferred output digital signals to recover data transmitted from the end points.

According to another aspect of the present invention, there is provided a method of operating a wireless data communications system, comprising the steps of: receiving at a radio a data transmission from a network endpoint, the transmission having been performed in accordance with a predefined network standard; digitally sampling the received signal at the radio and outputting digital samples corresponding to the inphase and quadrature components of the received signal; transferring the output digital samples, via a backhaul network, to a basestation; receiving at the basestation the output digital samples and executing a network core to recover the data transmission, the network core corresponding to the predefined network standard.

According to another aspect of the present invention, there is provided a wireless data communications system comprising: a plurality of endpoints, each endpoint operating according to one of at least two different predefined network standards and transmitting data via radio transmissions in accordance with the corresponding network standard; at least one radio operable to receive radio transmissions from at least one of the plurality of endpoints, the radio creating digital samples of the inphase and quadrature components of the received radio transmissions and outputting the digital samples; a basestation executing at least two different network cores, each network core corresponding to one of the at least two different predefined network standards; a backhaul telecommunications network transferring output digital samples from the at least one radio to the basestation; and wherein the network cores executing at the basestation processes the transferred output digital signals to recover data transmitted from the end points.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
FIG. 1 shows a prior art LPWAN network.
Figure 1:
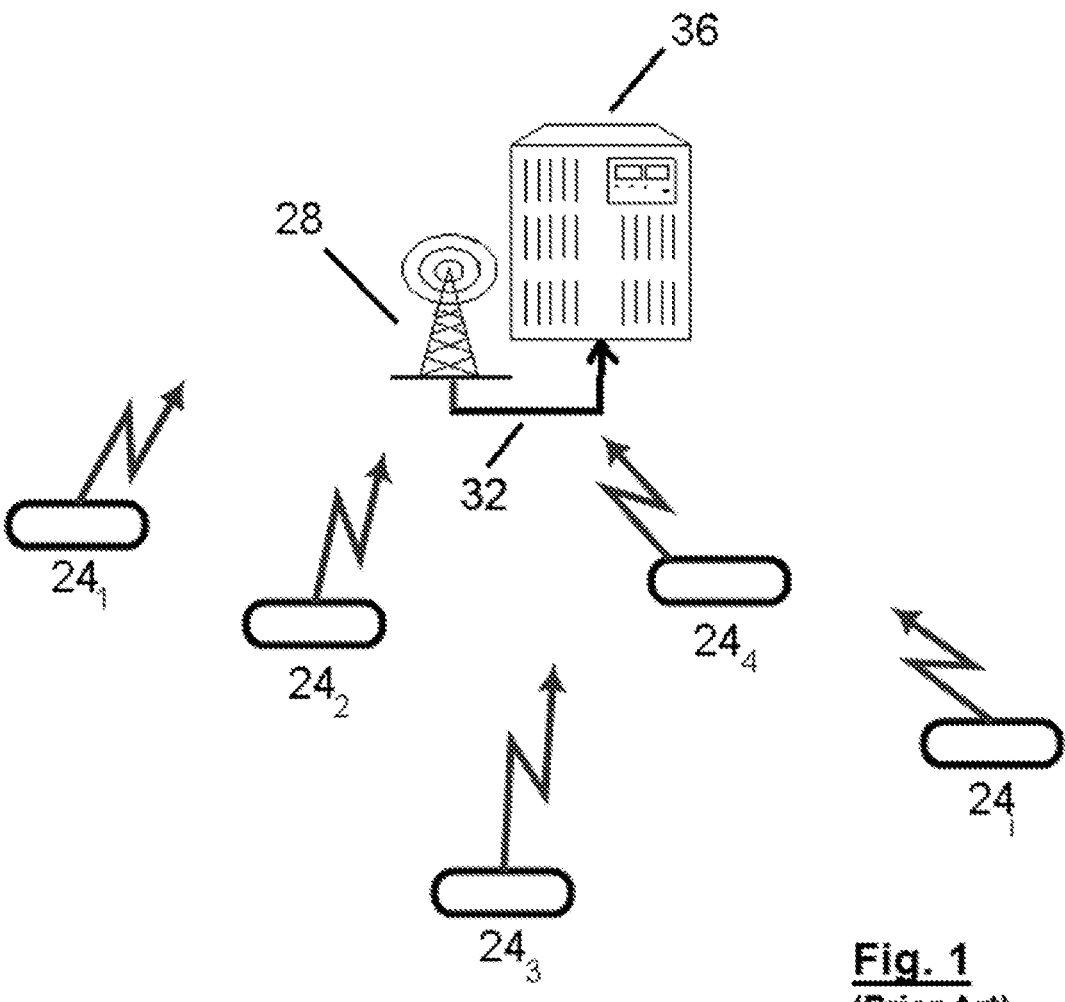

A prior art LPWAN network, in this example a MIOTY network, is indicated generally at 20 in FIG. 1. Network 20 includes a variety of network endpoints $24_1$, $24_2$, $24_3$, $24_4$, . . . , $24_i$. In some deployments, several hundred or more endpoints 24 may be present in network 20.

Endpoints 24 communicate, wirelessly, with radio 28 which in many systems is a purpose-built ASIC, or equivalent. The output 32 from radio 28, which comprises digitized samples of the Inphase (I) and Quadrature (Q) components of the signals received by radio 28, is provided to an adjacent basestation 36.

Basestation 36 executes network core software which, amongst other functions, processes the samples of I and Q from output 32 to extract the data transmitted from endpoints 24 served by basestation 36. Basestation 36 can then forward, typically via a backhaul such as the Internet or a private data network (not shown), the received signals to their intended destination.

In some cases, network 20 is unidirectional, only enabling communication from endpoints 24 to basestation 36, and in others network 20 can be bidirectional, enabling communication from endpoints 24 to basestation 36 and from basestation 36 to endpoints 24. The present invention is useful with both unidirectional and bidirectional deployments, as will be apparent from the following detailed description.

Figure 2:
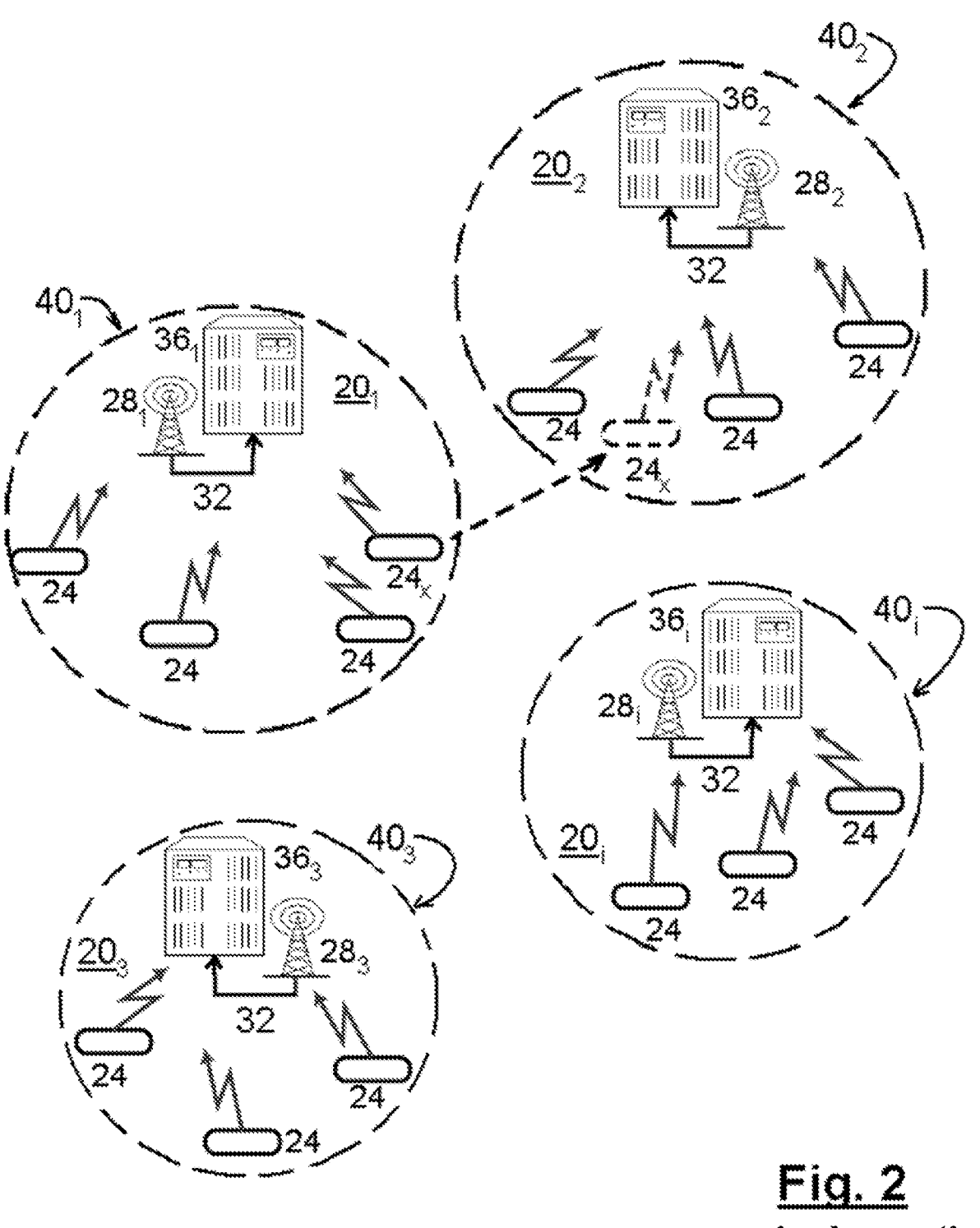
FIG. 2 shows multiple instances of the prior art network of FIG. 1 which are employed to provide a larger coverage area.

FIG. 2 shows the deployment of several prior art LPWAN networks $20_1$ . . . $20_i$, wherein the service coverage area 40 of each radio 28 is indicated diagrammatically by a circle. As will be understood by those of skill in the art, the actual coverage area of a radio 28 is almost never circular, due to geographic topography and the presence of buildings and obstacles, and will change, in both size and shape, over time due to noise from other radio sources, atmospheric effects, etc.

As can be readily seen, when the total area which is desired to be served by an LPWAN network exceeds the area 40 that is reliably covered by a radio 28, additional radios 28 and corresponding basestations 36 must be deployed to provide necessary coverage.

The need to deploy additional basestations 36 and radios 28 to obtain a coverage area which can serve a plurality of endpoints 24 significantly increases the hardware expense (radios 28 and basestations 36) to deploy the network. Further, the ongoing network operating and management costs and the administrative burden of operating the network is also increased, as the multiple basestations 36 must be managed, their software maintained and updated as necessary, hardware must be checked, tested and maintained, etc.

With respect to the increase in the network management burden, in addition to having to separately manage and maintain multiple basestations 36, it is not unknown that an endpoint (e.g. —endpoint $24_x$) may "move" from the coverage area (e.g. $40_1$) of one basestation $36_1$ to the coverage area (e.g. $40_2$) of another basestation $36_2$. Such a move can occur intentionally, as the endpoint $24_x$ is physically moved from one location to another, or can occur inherently/unintentionally as coverage areas $40_1$ and $40_2$ vary due to environmental conditions, alterations to their deployments, the deployment of additional basestations 36 and radios 28, etc.

In such cases, the operator(s) of networks 20 must actively perform network management for the respective basestations 36 to have the endpoint $24_x$ reassigned from basestation $36_1$ to basestation $36_2$ to re-enable the endpoint $24_x$ to communicate with the respective basestation 36. Until the movement of endpoint $24_x$ is recognized and such network management to reassign endpoint $24_x$ is performed, no communication will be received from endpoint $24_x$ at basestation $36_1$ after endpoint $24_x$ has moved from coverage area $40_1$ to coverage area $40_2$ and basestation $36_2$, not recognizing endpoint $24_x$, will not process signals from it or to it.

Further, other network management functions, such as usage tracking for billing, software updates, preventative maintenance, etc. must be performed on each basestation 36, increasing the expense and labor burden to maintain and operate networks 20.

Figure 3:
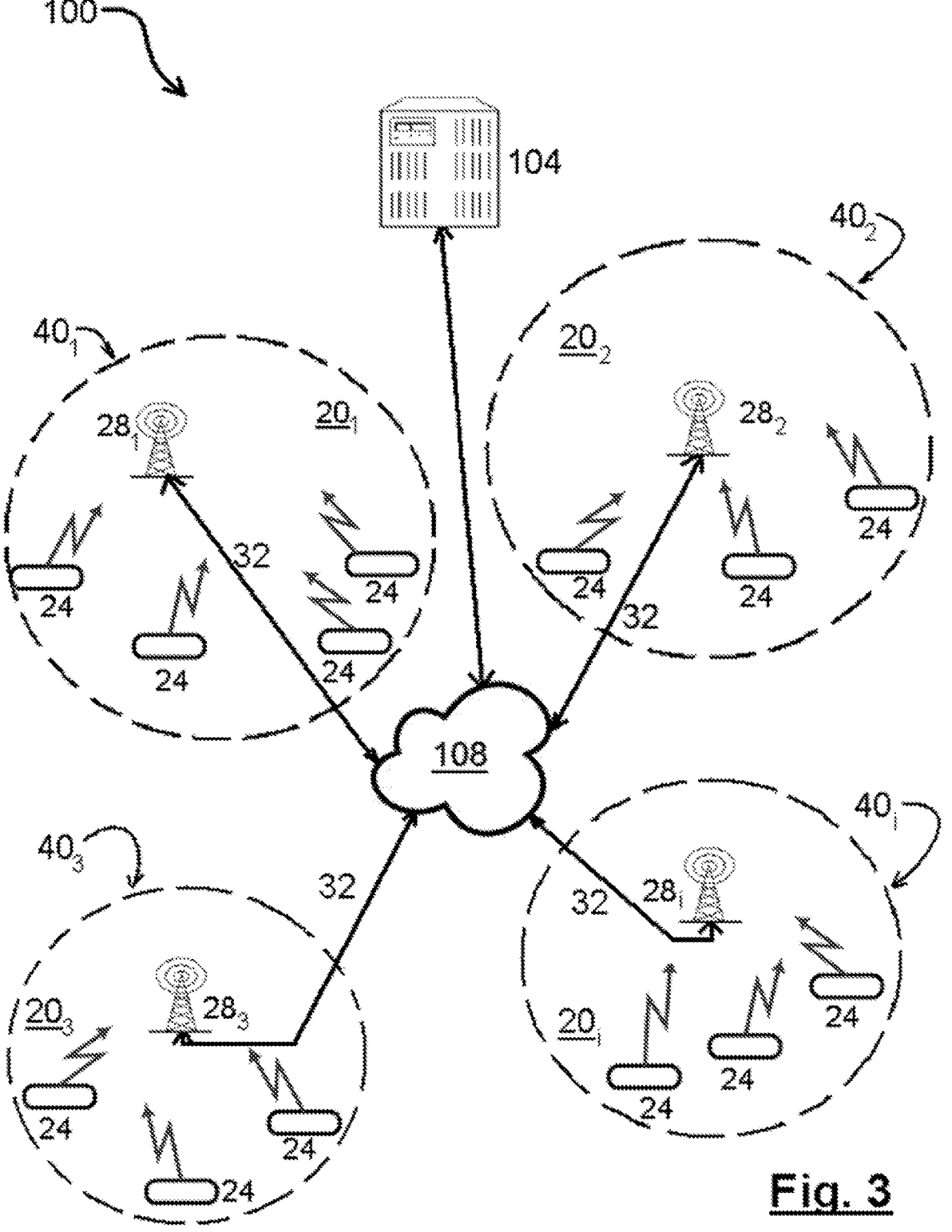
FIG. 3 shows an LPWAN network in accordance with an aspect of the present invention.

FIG. 3 shows an LPWAN network, as indicated generally at 100, in accordance with an aspect of the present invention and wherein components similar to those described above are indicated with like reference numerals. As shown, network 100 includes a plurality of endpoints 24, a number of radios $28_1$ to $28_i$, and a basestation 104, operating an instance of at least one network core software.

In network 100, signals from endpoints 24 are received by at least one radio 28, each radio 28 having a corresponding service area 40. In many cases radios 28 will be software defined radios, or SDRs (having digital filters, etc. allowing for defining the operating frequencies and bandwidths of the radio via software) and outputting digitized samples of the I and Q components of received signals, but it is also contemplated that, in some cases, radios 28 can be conventional radios which have been equipped with means to digitize their received signals and to output I and Q component samples. As used herein, the term "software defined radio" (or "SDR") is intended to comprise both these configurations.

Output 32 from each radio 28 is forwarded to basestation 104 via a backhaul network 108, which can be the Internet, a private data network or any other suitable system or method for radios 28 to communicate with basestation 104. It is contemplated that backhaul network 108 will commonly be a wired network, but is also contemplated that in some circumstances backhaul network 108 can also be a wireless network, such as a cellular data network, satellite data network, a microwave data link, etc.

In some circumstances, it is contemplated that output 32 may be digitally compressed, preferably using a suitable lossless digital compression system, before transmission through backhaul network 108 and then decompressed when received by basestation 104. It is contemplated that, as the additional computational burden on radio 28 to perform data compression may require a radio 28 with additional computational capacity, and thus having a higher hardware cost, compression can be employed only on the output 32 from some radios 28 if desired. For example, some backhaul connections between radios 28 and basestation 104 may have more limited, or expensive, available bandwidth than others. Those radios 28 in network 100 connected to such backhaul links can employ data compression to reduce the associated backhaul costs, while other radios 28 in network 100 would not employ data compression. In such a deployment, basestation 104 will be able to determine if a received output 32 has been compressed, or basestation 104 will maintain records indicating which radios 28, if any, employ data compression.

Basestation 104 can be any computing device which executes an instance of at least one network core software (such as, in the case of a MIOTY network, the MIOTY core software, or for a LoRa network, the LoRa core software) to process the digitized output 32 that is received through backhaul network 108 from each radio 28.

In network 100 basestation 104 services all of radios 28 within network 100, providing numerous advantages over the prior art. As is now apparent, one significant advantage obtained is that the hardware, and related expenses, otherwise required for multiple basestations 36 is avoided.

Further, while basestation 104 can be a single, appropriately sized, computing device, it is presently preferred that basestation 104 is instead a cloud-based computing device, meaning that it can be executed on one or more computing devices/servers supplied via a software as service (SaaS) provider such as, for example, Microsoft's Azure network, Amazon's AWS Cloud, Google's Cloud, etc. Thus, while only a single basestation 104 is advantageously required to execute the network core software (or softwares) to operate network 100, that basestation 104 can be sized, by adding or removing cloud supplied computational resources to the virtual device if and as needed.

Such flexibility in the sizing of the computational capacity of basestation 104 provides a variety of advantages, as will now be discussed below.

It is contemplated that in many circumstances network 100 will be initially deployed to serve a limited number of transmission between radios 28 and endpoints 24 and thus the computational load on basestation 104 to execute core software will be relatively low. As time goes on, transmission traffic may increase and additional endpoints 24 and radios 28 may be added to network 100 and thus the computational load on basestation 104 will increase correspondingly. In such a case, the ability to scale basestation 104 on cloud-based computing devices/servers can be a significant cost savings for deployments, compared to prior art networks requiring multiple basestations 36, each of which would have to be selected to have sufficient computational resources to service a fully deployed network 20 or, otherwise basestations 36 would require replacement with more powerful hardware as endpoints 24 on network 20 increased and/or additional basestations 36 would have to be deployed.

Further, as SaaS-based services often can provide computational resources at a lower cost than comparable standalone devices (such as basestations 36), basestation 104 can employ increased levels of computation, as necessary, to recover signals from endpoints 24 which would otherwise be non-recoverable in networks 20 employing basestations 36 which have been selected, to reduce costs, with limited computational capacity. For example, improved algorithms (with higher computational workloads) for recovering signals from data 32 can be executed by basestation 104, effectively increasing the signal to noise ration of transmissions to basestation 104 and providing a greater probability that a signal sent by an endpoint 24 will be properly received and decoded by basestation 104.

Figure 4:
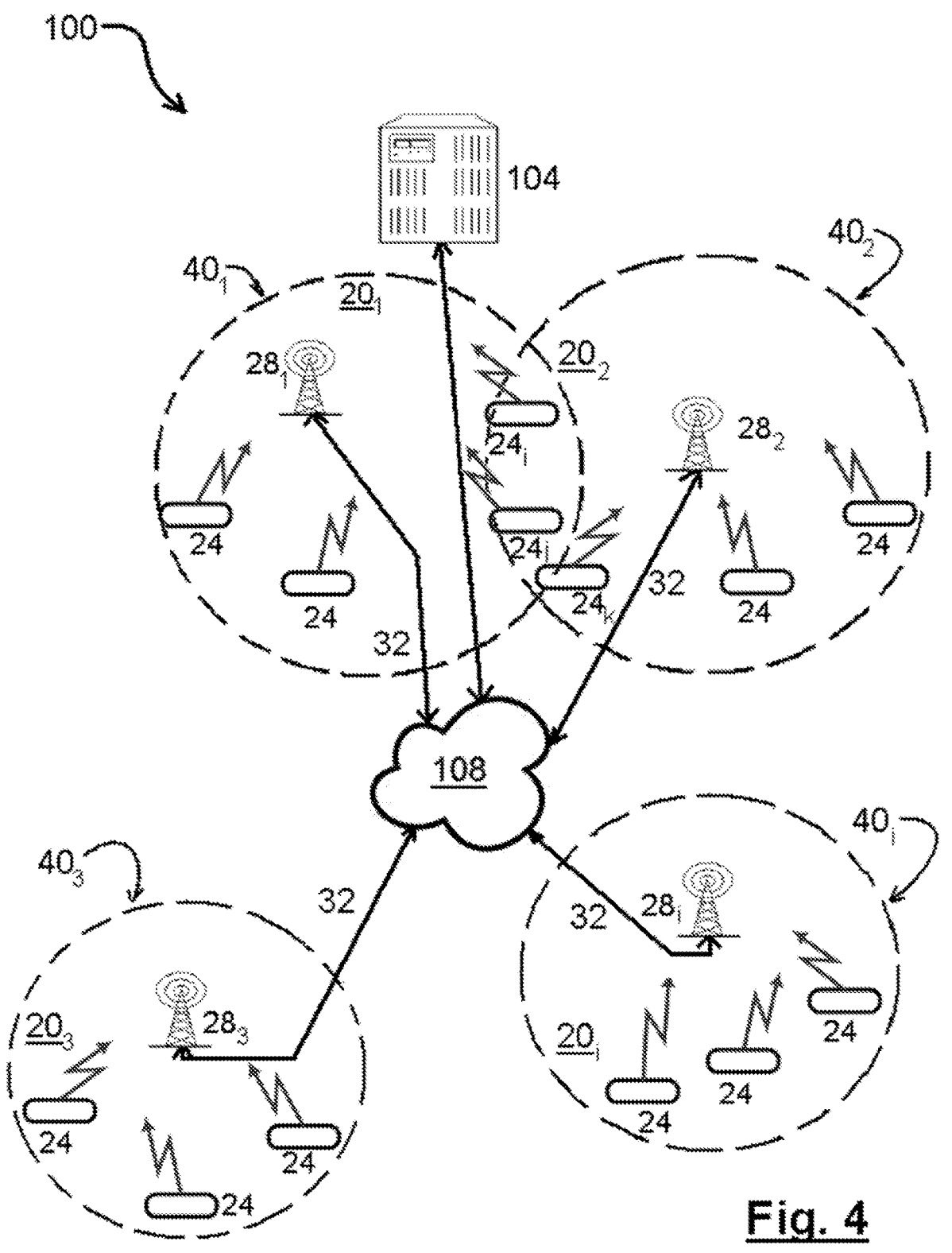
FIG. 4 shows another deployment of the network of FIG. 3.

It is further contemplated that joint detection and/or RAKE-type and/or MIMO-like methodologies and algorithms can be employed. As shown in FIG. 4, basestation 104 can receive data 32 from multiple radios 28 (e.g. —$28_1$ and $28_2$) which may have overlapping coverage areas 40 (e.g. —$40_1$ and $40_2$), and thus basestation 104 can receive output 32 from two or more radios 28 (e.g. —$28_i$ and $28_2$) which have received a transmission from the same endpoint 24 (e.g. —$24_i$, $24_j$, $24_k$). Basestation 104 can employ the above-mentioned more computationally expensive algorithms, or others, to combine and take advantage of these multiple receptions to increase the effective signal-to-noise ratio (SNR) of the received signals, increasing the probability that transmissions from the respective endpoints 24 are correctly received.

Even if it is not required to increase the probability of correct reception, by using such computationally expensive algorithms at basestation 104, the effective SNR of received signals can be maintained while the transmission power used to transmit these signals is correspondingly reduced. Reducing the required transmission power can advantageously increase the battery lifetime of endpoints 24.

It is contemplated that, in some cases, network 100 will be deployed with coverage areas 40 intentionally overlapping to permit basestation 104 to increase the effective SNR of received signals from a majority of endpoints 24 in network 100. Such a deployment of network 100, with intentionally overlapped coverage areas 40, will only require additional radios 28 to be deployed and additional computational capacity to be provided at basestation 104 according to the computational requirements of executing the network core, which may be a commercially reasonable deployment strategy. Further, it is possible to initially deploy network 100 without intentionally overlapping coverage areas 40 and to subsequently add additional radios 28 as "infill" to provide overlapping coverage areas 40, and to add additional computational processing capacity at basestation 104, if need, as desired.

Network 100 provides additional advantages. For example, as network 100 is operated with a single basestation 104, network management tasks such as preventative maintenance and/or software updates are accomplished much more easily than with prior art networks 20 as only a single instance of the core software executed on basestation 104 need be maintained.

Figure 5:
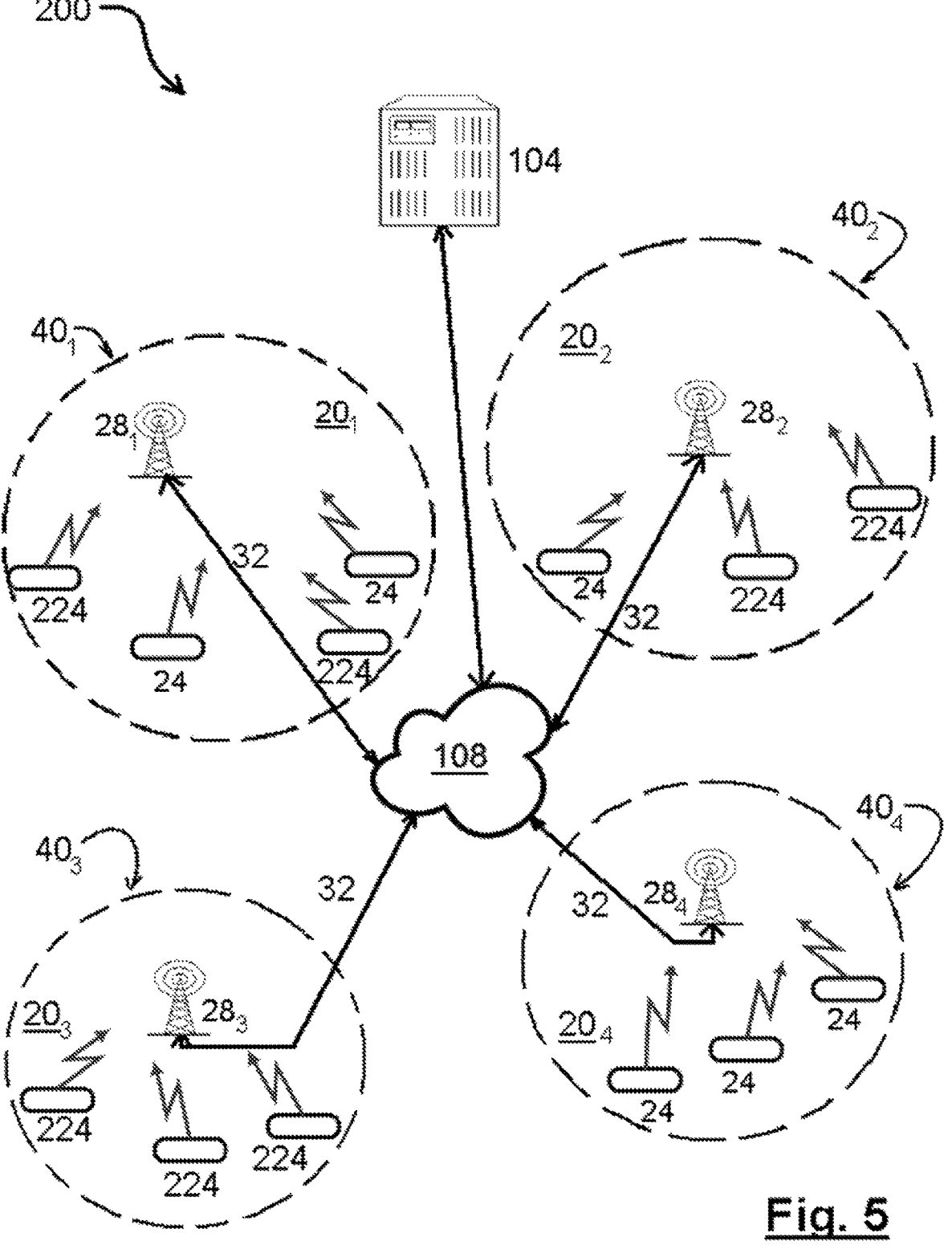
FIG. 5 shows an LPWAN network in accordance with an aspect of the present invention which operates under multiple predefined network standards.

FIG. 5 shows another LPWAN network, indicated generally at 200, in accordance with an aspect of the present invention and wherein components similar to those described above are indicated with like reference numerals. As is known to those of skill in the art, there are currently multiple competing LPWAN network standards which are in use including, for example MIOTY, LoRa, etc., and it is contemplated that additional, new, standards will be deployed in the future. An advantage of the present invention is that basestation 104 can service endpoints employing different supported network standards in network 200.

For example, if basestation 104 is executing a MIOTY software network core and a LoRa software network core, network 200 can include and service endpoints 24, which operate in accordance with the MIOTY standard and endpoints 224 which operate in accordance with the LoRa standard.

In some cases, for example the above-mentioned example of LoRa and MIOTY network standards, the wireless communication between radios 28 and endpoints 24 and endpoints 224 of network 200 occurs in the same radio frequency spectrum and it can be a simple matter to configure radios 28 to communicate with both endpoints 24 and 224 of both network standards.

In other cases, one network standard serviced by network 200 may employ a different portion of the radio spectrum than another network standard serviced by network 200 and in such cases radios 28 of network 200 can be constructed to operate in each relevant portion of the radio spectrum to communicate with both endpoints 24 and endpoints 224, or can be constructed to operate in only one portion of the radio spectrum to only communicate with endpoints 24 or endpoints 224. In the former case, it is preferred that radios 28 be SDRs to provide the necessary flexibility of operating with multiple network standards. However, it is also contemplated that radios 28 which only operate in a single portion of the radio spectrum may, in some circumstances, make this a preferred deployment option for cost savings.

In FIG. 5, radios 28₁ and 28₂ can communicate with endpoints operating under MIOTY (24i) and LoRa (224i), while radio 28₃ only communicates with endpoints 224ᵢ operating under the LoRa standard and radio 28₄ only communicates with endpoints 24ᵢ operating under the MIOTY standard.

It is further contemplated that endpoints 24, 224 can implement at least portions of two or more different supported network standards. For example, one or more endpoints 24 can implement the MIOTY standard for uplink (to radio 28) communications, while implementing a downlink portion of the LoRa standard. As different network standards offer different capabilities and modes, it is possible with the present invention to select to implement all, or portions, of different network standards in an endpoint 24, 224 as best suited to particular tasks to improve overall network efficiency. Thus, network 200 can in many cases retrofit legacy network standards or implement future standards without requiring new hardware.

The present invention is not limited to use with MIOTY and/or LoRa network standards, and a variety of other useful network standards, such as Sigfox, etc. will occur to those of skill in the art. Further, the present invention is not limited to use with only two network standards and it is contemplated that network 200 can service endpoints operating under three or more different networks standards and/or with radios and endpoints operating in three or more different portions of the radio spectrum.

As should now be apparent to those of skill in the art, running two or more defined network standards will increase the computational load on basestation 104 to execute the corresponding network core softwares and as different sampling rates may be used by different network standards, etc. Therefore the ability to scale the computational capacity of basestation 104 via cloud resources is a significant advantage. Further, it is contemplated that another (second or third, etc.) predefined network standard can be implemented on a temporary basis, as needed, and then removed from network 200 when no longer needed. For example, it may be desired to implement a second predefined network standard in network 200 to optimize the deployment of an upgrade to a first predefined network standard already being implemented in network 200. In such a case, the second network standard and be deployed to endpoints 24, 224 and the computation capacity of basestation 104 can be increased to execute the second network core software. When the deployment of the upgrade is complete, endpoints 24, 224 can cease running the second network standard, as can basestation 104, which will then resize its computational capacity accordingly.

Figure 6:
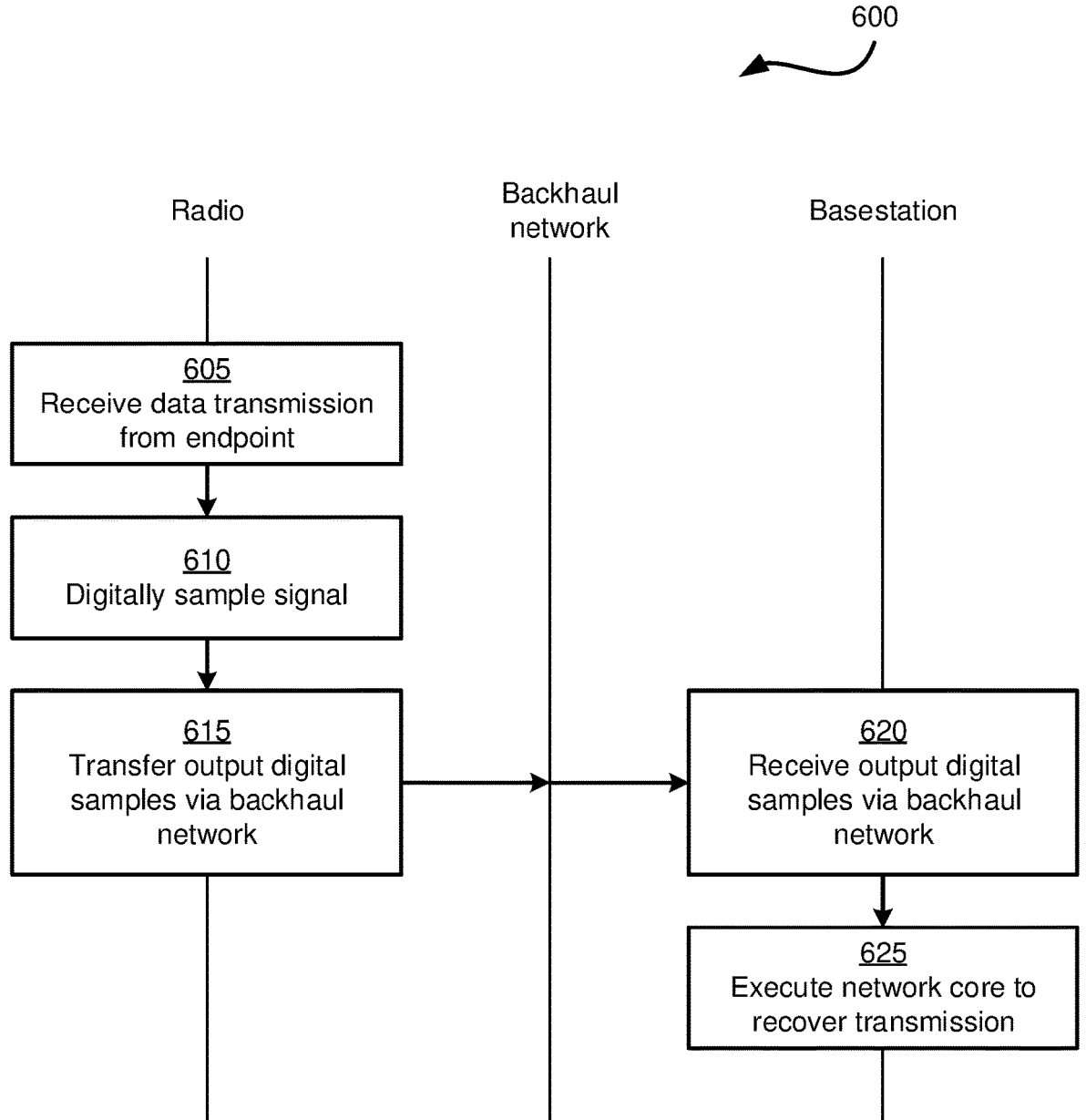
FIG. 6 shows a flow diagram of a method of operating a wireless data communications system in accordance with an aspect of the present invention.

FIG. 6 is a flow diagram of a method 600 of operating a wireless data communications system. Method 600 will be described in conjunction with its performance in network 100 and network 200. In other examples, method 600 may be performed in other suitable systems.

At block 605, at least one of radios 28 receives a data transmission from a network endpoint, such as endpoints 24 or 224. The transmission is performed in accordance with a predefined network standard, such as LoRa or MIOTY standards, or other suitable network standards.

At block 610, radio 28 digitally samples the received signal and outputs digitized samples of the inphase (I) and quadrature (Q) components of the received signal. Radio 28 thus generates output 32 as output digital samples corresponding to the received signal.

At block 615, radio 28 transfers the output digital samples, via backhaul network 108, to basestation 104. For example, radio 28 may transfer the output digital sample via a wired backhaul network, the internet, a private data network, or other suitable backhaul network. In some examples, radio 28 may additionally process the output digital samples prior to transferring the output digital samples via backhaul network 108. For example, radio 28 may compress the output digital samples to a smaller size and transfer the compressed output via backhaul network 108.

At block 620, basestation 104 receives the output digital samples via the backhaul network. In some examples, basestation 104 can additionally perform preprocessing on the received output digital sample. For example, if the output digital sample is compressed, basestation 104 can decompress the output digital sample.

Since basestation 104 services multiple radios 28, some of which may compress the output digital samples, and some of which may not, basestation 104 can For example, basestation may determine whether each received output digital sample is compressed and process it accordingly. For example, the basestation 104 may analyze the output digital sample itself, or basestation 104 may store records indicating which radios 28 which compress the output digital samples and process the output digital sample according to radio 28 from which it was received.

The basestation 104 can also perform additional signal processing on the received output digital samples to increase an effective signal to noise ratio of the data transmission.

At block 625, basestation 104 executes a network core to recover the data transmission. In particular, the network core executed by basestation 104 corresponds to the predefined network standard. That is, basestation 104 can execute a LoRa network core when the data transmission was performed in accordance with the LoRa network standard, a MIOTY network core when the data transmission was performed in accordance with the MIOTY standard, and the like. Basestation 104 may similarly execute the appropriate network core by considering records of which radios 28 receive data transmissions under which network standards, or by determining the network standard from the output digital sample itself.

As should now be apparent, the present invention provides a novel LPWAN system and method of operating such a network, by deploying multiple radios which communicate with a single instance of the network operating core software. The single basestation enables simplified network management (e.g. —endpoint admission, etc.) and basestation maintenance (e.g. —software updates, etc.) and reduces network deployment costs, as the single basestation device serves multiple radios over multiple coverage areas. Further, the single basestation can be a software as a service device/server, allowing the computational capacity of the basestation to be scaled, as necessary, to service the network. Further still, by having multiple radios provide their received signals to the single basestation, signal processing algorithms which can process multiple received versions of a signal to enhance the signal's effective SNR can be employed.

The above-described embodiments of the invention are intended to be examples of the present invention and alterations and modifications may be effected thereto, by those of skill in the art, without departing from the scope of the invention which is defined solely by the claims appended hereto.

I claim:

1. A wireless data communications system comprising:
a basestation executing a first network core corresponding to a first predefined network standard and a second network core corresponding to a second predefined network standard;
a backhaul telecommunications network;
a plurality of endpoints, wherein a first subset of the plurality of endpoints operates according to the first predefined network standard and a second subset of the plurality of endpoints operates according to the second predefined network standard;
at least one radio operable to receive radio transmissions from at least one of the plurality of endpoints, the radio creating digital samples of inphase and quadrature components of the received radio transmissions and transferring the digital samples to the basestation via the backhaul telecommunications network;
wherein the basestation processes the digital samples from endpoints in the first subset with the first network core and the digital samples from endpoints in the second subset with the second network core to recover data transmitted from the endpoints; and
wherein the output digital samples from at least one of the plurality of endpoints is compressed to a smaller size by the at least one radio before it is transferred through the backhaul network and wherein the basestation decompresses compressed signals received from the backhaul network before processing them with executing the network core.

2. The system of claim 1 wherein the basestation comprises a cloud based computing device.

3. The system of claim 2 wherein a computational capacity of the cloud based computing device is increased and decreased corresponding to computational requirements of executing the network core.

4. The system of claim 1 wherein the wireless data communications system is unidirectional, operating to transfer data from the plurality of endpoints to the basestation.

5. The system of claim 1 wherein at least one endpoint is a software defined radio.

6. The system of claim 5 wherein the at least one endpoint implements at least portions of two different network standards.

7. The system of claim 1 wherein the basestation further executes additional signal processing on received output digital samples to increase an effective signal to noise ratio of data transmitted from the at least one endpoint.

8. The system of claim 1 comprising at least two radios and wherein the at least two radios each receive data transmitted from at least one endpoint and wherein the basestation executes the network core and additional signal processing to combine digital samples received from each of the at least two radios to improve a signal to noise ratio of the received signal corresponding to the data transmitted from the at least one end point.

9. A method of operating a wireless data communications system, comprising the steps of:
receiving at a radio a data transmission from a network endpoint, the data transmission having been performed by the network endpoint in accordance with one predefined network standard from a plurality of predefined network standards;
digitally sampling the received signal at the radio and outputting digital samples corresponding to inphase and quadrature components of the received signal;
compressing, at the radio, the output digital samples to a smaller size;
transferring the compressed output digital samples, by the radio via a backhaul network, to a basestation;
receiving at the basestation the compressed output digital samples and decompressing the compressed output digital samples;
determining the one predefined network standard of the plurality of predefined network standards for the data transmission; selecting, at the basestation, from a plurality of network cores corresponding to the plurality of predefined network standards, one network core corresponding to the one predefined network standard for the data transmission; and
executing the one network core to recover the data transmission.

10. The method of claim 9 wherein at least two radios receive the data transmission from the network endpoint, each of the at least two radios radio digitally sampling the received signal and outputting respective digital samples corresponding to the inphase and quadrature components of the received signal, transferring the respective output digital samples from each of the at least two radios via the backhaul network to the basestation and wherein the network core executed at the basestation combines the respective digital samples from each of the at least two radios to increase the signal to noise ratio when recovering the data transmission.

* * * * *